Dec. 15, 1936.   I. E. COHN ET AL   2,064,414
FILM SPLICING DEVICE
Filed Feb. 11, 1936
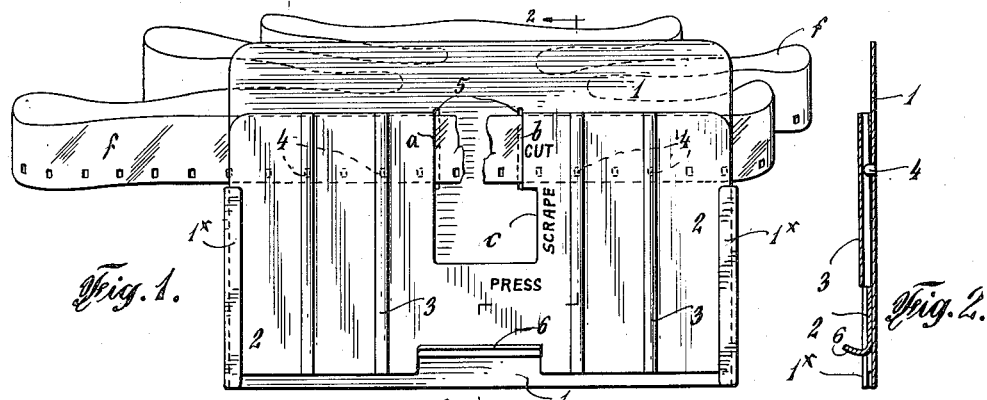
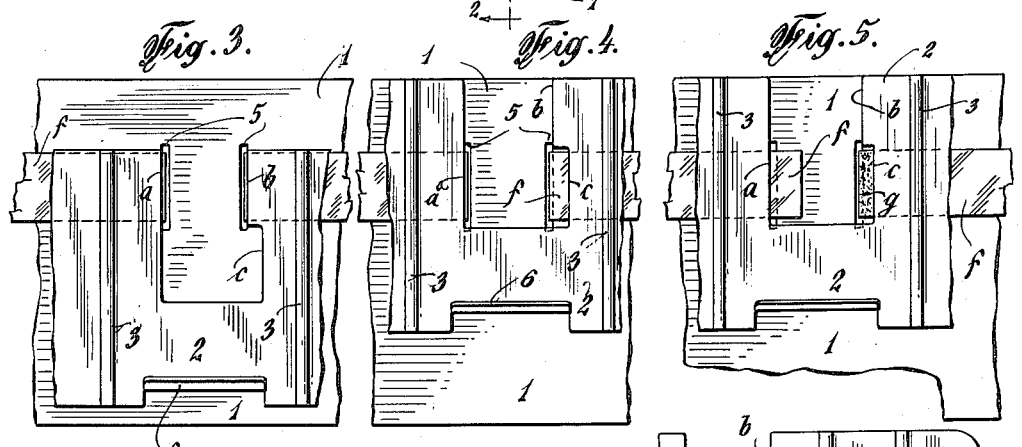
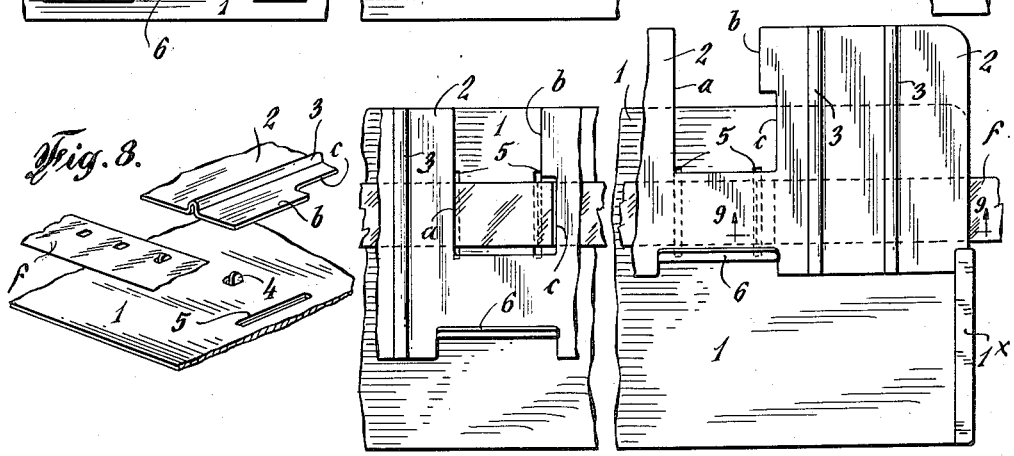
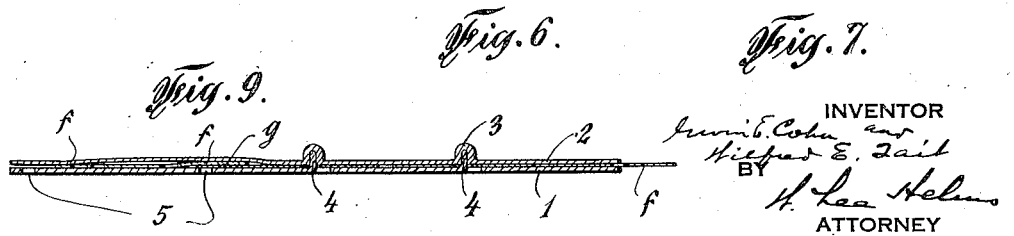

Patented Dec. 15, 1936

2,064,414

UNITED STATES PATENT OFFICE 2,064,414

FILM SPLICING DEVICE

Irwin E. Cohn and Wilfred E. Tait, New York, N. Y., assignors to Irwin Novelty Co., Inc., New York, N. Y., a corporation of New York Application February 11, 1936, Serial No. 63,352

3 Claims. (Cl. 154—42)

The object of the present invention is to provide a simple and effective device for quickly and accurately splicing the ends of a film strip or strips, more particularly applicable to motion picture film.

The characteristic of the device is the provision of a single movable member which may be moved to three positions in succession, one for defining and guiding the line of cut, a second for defining and guiding the emulsion exposed section of one strip for scraping, and the third for covering spliced ends and pressing them into engagement until they are adhered.

The invention will be described with reference to the accompanying drawing in which:

Figure 1 is a view in elevation of an embodiment of the invention, showing two broken ends of a film in position preliminary to cutting.

Figure 2 is a transverse section on the line 2—2, Fig. 1.

Figure 3 is a fragmentary plan view, showing the position of the parts and film end after cutting.

Figure 4 is a view similar to Figure 3, showing the position of one end of the film preliminary to scraping.

Figure 5 is a view similar to Figure 4, showing the film ends after one end has received an adhesive preliminary to mutual adherence to the ends.

Figure 6 is a view similar to Figure 5, showing the ends of the film adhered together.

Figure 7 is a fragmentary view similar to Figure 6, showing the position of the parts during the pressing operation, thus completing the joining of the film ends.

Figure 8 is a fragmentary perspective view of a portion of the base plate to illustrate the formation of the film holding prongs, also showing spaced therefrom the presser plate to illustrate its method of clearing the prongs.

Figure 9 is an enlarged transverse section on the line 9—9, Figure 7, looking in the direction of the arrows.

The device comprises a base plate 1 of sheet metal which is stamped with laterally extending lips turned over in the same plane as the major faces of the base plate to afford slideways 1x for a presser plate 2.

The presser plate 2 is formed with transversely extending inverted channelways 3 to clear spaced prongs 4 projected upwardly from the base plate 1. These prongs are received in the feed apertures of a film strip or film strips having broken ends to be joined, as indicated in Figure 1.

Presser plate 2 is mounted to slide under top walls of the slideways 1x and its lower face rests directly upon the base plate 1.

The base plate 1 is formed with two spaced slits or depressions at 5 which, in the initial position of the parts, lie adjacent the gauge walls a and b of the presser plate. The film f is placed over upon the base member 1 and moved downwardly until the lower edges of opposite end sections abut and are positioned by the top edges of the slideways 1x being slipped over the prongs 4 so that they enter the feed apertures of the film. The broken edges of each film end are projected slightly beyond the cutting depressions or slits 5. Thereupon the presser plate is moved upwardly as by means of the finger piece 6 and a sharp knife is used to cut the film, the line of cut being guided by the walls a and b of the presser plate. Thereupon the presser plate is moved to the position illustrated in Figure 4 providing a gauge wall c set back from one end of the cut film and thus exposing the emulsion face thereof for predetermined width, that width being sufficient for the proper lapping of the cutting ends. The emulsion is then removed from the exposed area, and that area is covered with adhesive as indicated at g, Figure 5.

Referring to Figure 5, the end of the film at the left of the adhesive g is moved over until it abuts gauge wall c so that the latter serves as a measuring stop. The two ends are then lightly pressed together and the presser plate is given a further movement so as to cover the overlapping ends of the film and to exert pressure thereon due to the thickness of the overlapped film section. This pressure is enabled because of the fact that the presser plate is preferably of spring material and hence will yield upwardly to the slight extent required. The position of the parts will then be that illustrated in Figures 7 and 9. The parts remain in that position for the short period required to effect a set of the adhesive which generally is a very short interval of time due to the highly volatile nature of the solvent used, the solvent being, for example, amyl acetate with a binding agent of cellulose.

Having described our invention, what we claim and desire to secure by Letters Patent, is as follows:—

1. A film splicing device comprising a base member, a presser plate slidably held upon the base member, the base member being provided with means for holding the two end sections of film in position for severing, and the presser plate having a cut-away section of L formation and being movable to three positions, the edges of the presser plate at said cut-away section affording gauges for determining the lines of cut in one position of the plate, a gauge for determining a scraping and adhesive area for one end of the film in a second position of the plate, the plate in the third position covering overlapping and adhered ends of the film and being adapted to exert pressure thereon.

2. A device constructed in accordance with claim 1, in which the base plate is formed with spaced prongs adapted to enter feeding apertures of a motion picture film and the presser plate is formed with inverted channelways to permit movement of the plate relatively to said prongs, the prongs entering the channelways.

3. A film splicing device comprising a base plate carrying at its ends a pair of slideways, a presser plate abutting the base plate and slidable in said ways, prongs carried by the base plate and projected toward the presser plate, means formed in the presser plate for clearing the prongs and enabling movement of the presser plate relatively thereof, the presser plate being cut away from one longitudinal edge inwardly thereof to afford opposed cutting gauge walls and a scraping and adhesive gauge wall extending laterally of one of said cutting gauge walls, the presser plate being movable beyond the prongs to enable positioning the film and being movable thence to three positions, to wit, film end cutting position, film end scraping and adhesive position and a position surmounting the film when the ends thereof have been cut, scraped and mutually adhered, the movement of the presser plate being in the face plane of the base plate.

IRWIN E. COHN.
WILFRED E. TAIT.